United States Patent
Metzler et al.

(10) Patent No.: US 9,497,268 B2
(45) Date of Patent: Nov. 15, 2016

(54) METHOD AND DEVICE FOR DATA TRANSMISSIONS USING RDMA

(71) Applicant: International Business Machines Corporation, Armonk, NY (US)

(72) Inventors: Bernard Metzler, Zurich (CH); Patrick Stuedi, Zurich (CH); Animesh Kumar Trivedi, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

(21) Appl. No.: 14/165,648

(22) Filed: Jan. 28, 2014

(65) Prior Publication Data
US 2014/0214997 A1    Jul. 31, 2014

(30) Foreign Application Priority Data
Jan. 31, 2013 (GB) .................................. 1301667.0

(51) Int. Cl.
G06F 15/167 (2006.01)
H04L 29/08 (2006.01)

(52) U.S. Cl.
CPC .................................. *H04L 67/1097* (2013.01)

(58) Field of Classification Search
CPC ................. H04L 47/2425; H04L 65/60; H04L 65/607; H04L 67/1097
(Continued)

(56) References Cited

U.S. PATENT DOCUMENTS

| 7,975,109 | B2* | 7/2011 | McWilliams | G06F 12/0284 711/141 |
| 8,489,817 | B2* | 7/2013 | Flynn | G06F 1/183 711/103 |

(Continued)

FOREIGN PATENT DOCUMENTS

| CN | 101599991 A | 12/2009 |
| CN | 101730889 A | 6/2010 |

OTHER PUBLICATIONS

Welsh, et al., "Jaguar: Enabling Efficient Communication and I/O in Java", Special Issue on Java for High Performance Network Computing, 2000, 14 pages.

(Continued)

*Primary Examiner* — Kristie Shingles
(74) *Attorney, Agent, or Firm* — Cantor Colburn LLP; Mercedes Hobson

(57) ABSTRACT

Method and device for data transmissions using RDMA. The present invention is implemented between a first entity using a first data structure type and a second entity using a second data structure type over a third entity. The third entity is coupled to a table caching fingerprints of first data structures of the first data structure type and second data structures of the second data structure type associated therewith. A certain first data structure and the second data structure associated therewith represent a certain, identical RDMA function call. A first data structure representing a certain RDMA function call is sent from the first entity to the third entity; the fingerprint for the sent first data structure is determined; a second data structure associated with the determined fingerprint is looked up in the table; and the looked up second data structure is sent to the second entity.

20 Claims, 7 Drawing Sheets

(58) Field of Classification Search
USPC .......................................... 709/220, 231, 212
See application file for complete search history.

(56) References Cited

U.S. PATENT DOCUMENTS

| | | |
|---|---|---|
| 2003/0149791 A1 | 8/2003 | Kane et al. |
| 2006/0045099 A1 | 3/2006 | Chang et al. |
| 2006/0274787 A1* | 12/2006 | Pong .................. G06F 12/0875 370/469 |
| 2009/0083392 A1* | 3/2009 | Wong .................. H04L 67/1097 709/212 |
| 2010/0174779 A1 | 7/2010 | Weiser et al. |
| 2012/0210041 A1 | 8/2012 | Flynn |

OTHER PUBLICATIONS

Metzler, et al., "jVerbs: Java/OFED for Cloud Computing", 2012 OpenFabrics Int' Workshop Presentations, 13 pages.
Chinese Office Action for CN Application No. 201410034036.1; mailed Jul. 5, 2016; 7 pgs.
Chinese Search Report for CN Application No. 2014100340361, dated Jun. 26, 2016; 2 pgs.

\* cited by examiner

METHOD AND DEVICE FOR DATA TRANSMISSIONS USING RDMA

CROSS-REFERENCE TO RELATED APPLICATION

This application claims priority under 35 U.S.C. §119 from European Patent Application No. GB 1301667.0 filed Jan. 31, 2013, the entire contents of which are incorporated herein by reference.

BACKGROUND OF THE INVENTION

1. Field of the Invention

The invention relates to data transmissions. More specifically, data transmissions using Remote Direct Memory Access (RDMA).

2. Description of Related Art

RDMA is a communication paradigm whereby application data is fetched directly out of a computer's local application memory and placed directly into the application memory of a remote computer. In bypassing the operating system and avoiding intermediate data copies in host memory, RDMA significantly reduces the CPU cost of large data transfers. Complete data copy avoidance (zero-copy) is achieved if the network interface controller (NIC) is able to move networked data directly between the application (buffer) memory and NIC buffer using a DMA engine.

PCT Application No. WO 2011/135515 A1 describes a method for data transmission on a device without intermediate buffering. A request is received to transmit data from the device to a second device over a network. The data from application memory is formatted for transmitting to the second device. A length of send queue is retrieved. The data are transmitted from the device to the second device without intermediate buffering. The length of the send queue is compared to the expected send queue length. If the length of the send queue is at least equal to and/or less than the expected send queue length, a completion element is generated.

U.S. Patent Application No. US 2011/0078410 A1 describes a method of and a system for multiple party communications in a processing system including multiple processing subsystems. Each of the processing subsystems includes a central processing unit and one or more network adapters for connecting each processing subsystem to the other processing subsystems. A multitude of nodes is established or created, and each of these nodes is associated with one of the processing subsystems. Here, pipelined communication using RDMA among three nodes may be involved, wherein the first node breaks up a large communication into multiple parts and sends these parts one after the other to the second node using RDMA, and the second node in turn absorbs and forwards each of these parts to a third node before all parts of the communication arrive from the first node.

Moreover, in a published paper, Matt Welsh and David Culler disclosed Jaguar: Enabling efficient communication and I/O in Java. They postulate that implementing efficient communication and I/O mechanisms in Java requires both fast access to low-level system resources (such as network and raw disk interfaces) and direct manipulation of memory regions external to the Java heap (such as communication and I/O buffers). Java native methods are too expensive to perform these operations and raise serious protection concerns. In Jaguar, a mechanism is provided that uses Java applications with efficient access to system resources by retaining the protection of the Java environment. This is accomplished through compile-time translation of certain Java byte codes to inlined machine code segments. In this paper, the use of Jaguar through a Java interface to the VIA fast communication layer is demonstrated, which achieves nearly identical performance to that of C and pre-serialized objects, a mechanism which reduces the costs of Java object serialization.

In particular, RDMA may be useful for data centers running cloud computing workload, because of a big buzz about low latency, high throughput and power consumption. Many cloud computing applications are written in Java and other interpreted languages, like C#. But high-performance RDMA support for interpreted languages is difficult and costly. In this regard, RDMA data structures need to be converted either into C data structures or into a hardware-dependent representation. In sum, serialization of RDMA function calls is expensive in interpreted languages like Java or C#.

In particular, the RDMA function calls may be provided as a two-dimensional list of work descriptors which has to be generated and serialized which is slow in Java. This needs to be done either when passing the two-dimensional list of work descriptors to a C library or when writing the list to the network interface controller.

SUMMARY OF THE INVENTION

Accordingly, one aspect of the present invention provides a method for data transmission using RDMA between a first entity and a second entity over a third entity. The method includes the steps of: sending a first data structure of a first data structure type representing a certain RDMA function call from the first entity to the third entity, the third entity being coupled to a table caching fingerprints of the first data structures of the first data structure type and the second data structures of a second data structure type associated therewith; determining the fingerprint for the sent first data structure; looking up the second data structure of the second data structure type associated with the determined fingerprint in the table, the looked up second data structure representing the certain RDMA function call; and sending the looked up second data structure to the second entity.

Another aspect of the present invention provides a device for data transmission using RDMA between a first entity and a second entity. The device includes: a receiver for receiving a first data structure of a first data structure type representing a certain RDMA function call from the first entity; a table for caching fingerprints of first data structures of the first data structure type and second data structures of a second data structure type associated therewith; a determiner for determining the fingerprint for the received first data structure; a processor for looking up the second data structure of the second data structure type associated with the determined fingerprint in the table, the looked up second data structure representing the certain RDMA function call; and a sender for sending the looked up second data structure to the second entity.

In the following, exemplary embodiments of the present invention are described with reference to the enclosed figures.

DETAILED DESCRIPTION OF THE PREFERRED EMBODIMENTS

Figure 1:
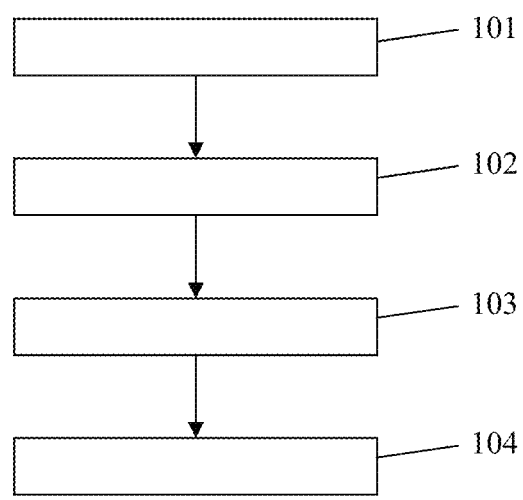
FIG. 1 shows a first embodiment of a sequence of method steps for data transmissions using RDMA between a first entity using a first data structure type and a second entity using a second data structure type.

The present invention provides for a method for data transmissions using RDMA between a first entity using a first data structure type and a second entity using a second data structure type over a third entity. The third entity is coupled to a table caching fingerprints of first data structures of the first data structure type and associated second data structures of the second data structure type. A certain first data structure and its associated second data structure represent a certain, identical RDMA function call. In a first step, a first data structure of the first data structure type representing a certain RDMA function call is sent from the first entity to the third entity. In a second step, the fingerprint for the sent first data structure is determined. In a third step, a second data structure of the second data structure type associated with the determined fingerprint is looked up in the table, where the looked up second data structure represents the certain RDMA function call. In a fourth step, the looked up second data structure is sent to the second entity.

Because often RDMA function calls are re-occurring, like reading or writing the same buffer several times, it is useful to fingerprint the RDMA function calls and to cache all the serialized data structures. Here, for each couple of a first data structure of the first data structure type and its associated second data structure of the second data structure type representing a same RDMA function call, a fingerprint is generated which can be cached in the table.

If a certain RDMA function call re-occurs, the cached second data structure is looked up in the table giving the fingerprint. As a result, serialization costs are avoided during re-occurring RDMA function calls. Thus, latency and CPU overhead are reduced.

According to some implementations, a certain RDMA function call includes at least one work descriptor. For the case of one single work descriptor, the present method may reduce latency by about 30% for buffer sizes smaller than 16K compared to conventional systems without RDMA function call caching. For operations with higher numbers of work descriptors, the improvement may be even greater.

In an embodiment, the first data structures of the first data structure type are embodied as hardware independent representations of RDMA function calls. Hardware-independent representations of RDMA function calls can be provided by Java or C#, for example.

In a further embodiment, the second data structures of the second data structure type are embodied as hardware dependent representations of RDMA function calls. The hardware-dependent representations of the RDMA function calls can be adapted to be interpreted by the NIC directly.

In a further embodiment, the first entity is embodied by an application of a processor for sending and receiving data from a network, the second entity is embodied by a NIC, and the third entity is embodied by an RDMA library and an RDMA user driver.

In a further embodiment, the first entity is embodied by an NIC, the second entity is embodied by an application of a processor for sending and receiving data from a network, and the third entity is embodied an RDMA library and an RDMA user driver.

The above two embodiments reflect an identical architecture adapted for the send case and the receive case, respectively.

In the above two embodiments, no path over an operating system of the processor is used, so that this path between the application and the NIC can be also called fast path for sending and receiving data between the application and the NIC. Thus, RDMA function calls including work descriptors, in particular containing references to the actual data buffers, can be directly mapped to the NIC using memory-mapped I/O.

According to some implementations, the network can be a system of interconnects that connect a single or a group of compute elements or processing elements, e.g. processors, or specialized nodes with Field Programmable Gate Array (FPGA;) with each other. It can be external, e.g. LAN, or internal, e.g. processor interconnects, or multiple NICs within a single server, for a given system installation. In the latter, a possible mode of communication can be: a first processor P1 can access a first NIC1 and send data using the first NIC1 to a second NIC2 via the network. Moreover, a second NIC2 is handled and/or processed by a second processor P2, which receives the data even though all four entities P1, P2, NIC1, and NIC2 can be part of a single physical system.

In a further embodiment, the first data structure type is embodied by a format of a first programming language. For example, the first programming language is Java or C#.

In a further embodiment, a further table is coupled to the second entity, said further table is adapted to cache fingerprints of data structures of the second data structure type and associated data structures of a third data structure type being used by a fourth entity.

In a further embodiment, the method also includes the following steps: receiving the second data structure looked up at the table coupled to the third entity at the second entity; determining the fingerprint of the received second data structure; looking up a third data structure of the third data structure type associated with the determined fingerprint in the further table, where the looked up third data structure represents the certain RDMA function call; and sending the looked up third data structure to the fourth entity.

In this embodiment, the first entity can be embodied by an application, the second entity by an RDMA library and an RDMA user driver, the third entity by an OFA kernel and a driver, and the fourth entity by an NIC.

In this embodiment, the present caching of fingerprints for translating certain RDMA function calls from one data structure type into another data structure type is used twice. In particular, the translation and therefore the caching can also be used several times.

In the above embodiment, a link over the operating system, the OFA kernel and driver, is used so that this path between the application and the NIC can also be called slow path for sending and receiving data between the application and the NIC.

In a further embodiment, the first data structure type is embodied by a format of a first programming language, in particular Java or C#, and the third data structure type is embodied by a format of a second programming language, in particular C.

Any embodiment of the first aspect of the present invention can be combined with any embodiment of the first aspect to obtain another embodiment of the second aspect.

According to a second aspect, the present invention provides for a computer program which includes a program code for executing the method of the above first aspect for data transmissions using RDMA when run on at least one computer.

According to a third aspect, the present invention provides for a device for data transmissions using RDMA between a first entity using a first data structure type and a second entity using a second data structure type. The device includes a receiver, a table, a determiner, a processor, and a sender. The receiver is configured to receive a first data structure of the first data structure type representing a certain RDMA function call from the first entity. Further, the table is configured to cache fingerprints of first data structures of the first data structure type and associated second data structures of the second data structure type. The determiner is configured to determine the fingerprint for the received first data structure. The processor is configured to look up a second data structure of the second data structure type associated with the determined fingerprint in the table, the looked up second data structure representing the certain RDMA function call. Moreover, the sender is configured to send the looked up second data structure to the second entity.

Similar or functionally similar elements in the figures have been allocated the same reference signs if not otherwise indicated.

Figure 2:
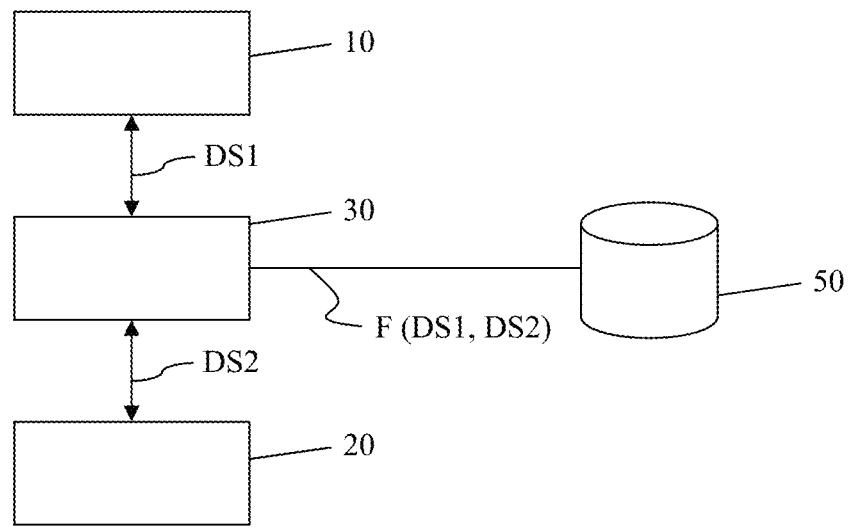
FIG. 2 shows a schematic block diagram of a first embodiment of a device for data transmissions using RDMA between a first entity using a first data structure type and a second entity using a second data structure type.
Figure 3:
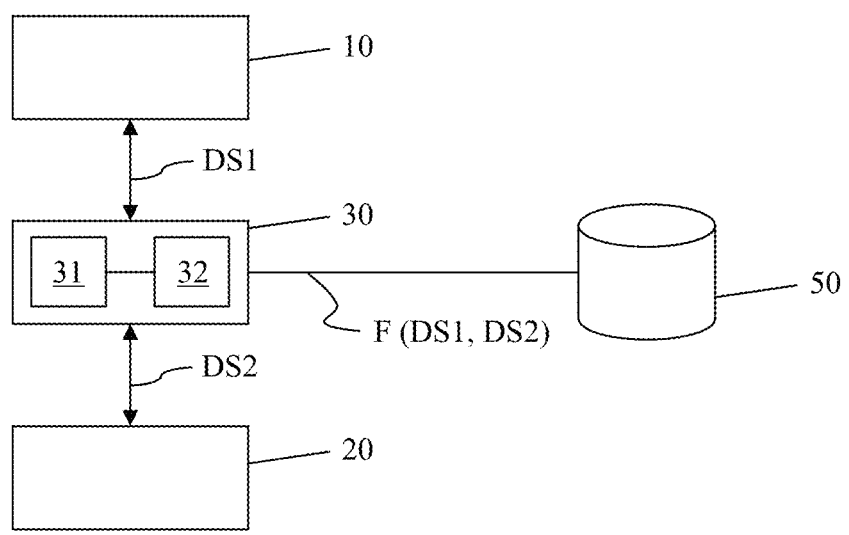
FIG. 3 shows a schematic block diagram of a second embodiment of a device for data transmissions using RDMA between a first entity using a first data structure type and a second entity using a second data structure type.

In FIG. 1, a first embodiment of the sequence of method steps for data transmission using RDMA between first entity 10 using a first data structure type and second entity 20 using a second data structure type is depicted. In this regard, FIG. 2 shows a first embodiment of a device for data transmissions using RDMA between the first entity 10 and second entity 20. A second embodiment of such a device is depicted in FIG. 3.

In the following, the method of FIG. 1 is discussed with reference to FIGS. 2 and 3.

In step 101, first data structure DS1 of the first data structure type is sent from first entity 10 to third entity 30. First data structure DS1 represents a certain RDMA function call. Third entity 30 is coupled to table 50 which is configured to cache fingerprints F (DS1, DS2) of first data structures DS1 of the first data structure type and the second data structures DS2 of the second data structure type associated therewith. First data structure DS1 and its associated second data structure DS2 represent the same RDMA function call. For each of these couples of DS1 and DS2, a respective fingerprint F (DS1, DS2) is stored in table 50.

In step 102, fingerprint F (DS1, DS2) for the sent first data structure DS1 is determined. This determination can be executed by first entity 10 or by third entity 30. In the case where first entity 10 determines fingerprint F (DS1, DS2), fingerprint F (DS1, DS2) is transferred from first entity 10 to third entity 30.

In step 103, second data structure DS2 of the second data structure type associated with the determined fingerprint F (DS1, DS2) is looked up in table 50, the looked up second data structure DS2 representing the certain RDMA function call.

In step 104, the looked up second data structure DS2 is sent to the second entity 20.

First data structures DS1 of the first data structure type can be embodied as hardware-independent representations of RDMA function calls. In contrast, second data structures DS2 of the second data structure type can be embodied as hardware-dependent representations of RDMA function calls.

From the perspective of first entity 10 of FIGS. 2 and 3, the device can be adapted for sending and receiving RDMA function calls, respectively.

For the example of the sending RDMA function calls, first entity 10 can be embodied by an application of a processor for sending and receiving data from a network, second entity 20 is embodied by an NIC and third entity 30 can be embodied by RDMA library 31 and RDMA user driver 32 (see FIG. 3).

Correspondingly, for the receive case, first entity 10 can be embodied by the NIC, second entity 20 can be embodied by the application and third entity 30 can be embodied by RDMA library 31 and RDMA user driver 32.

Figure 4:
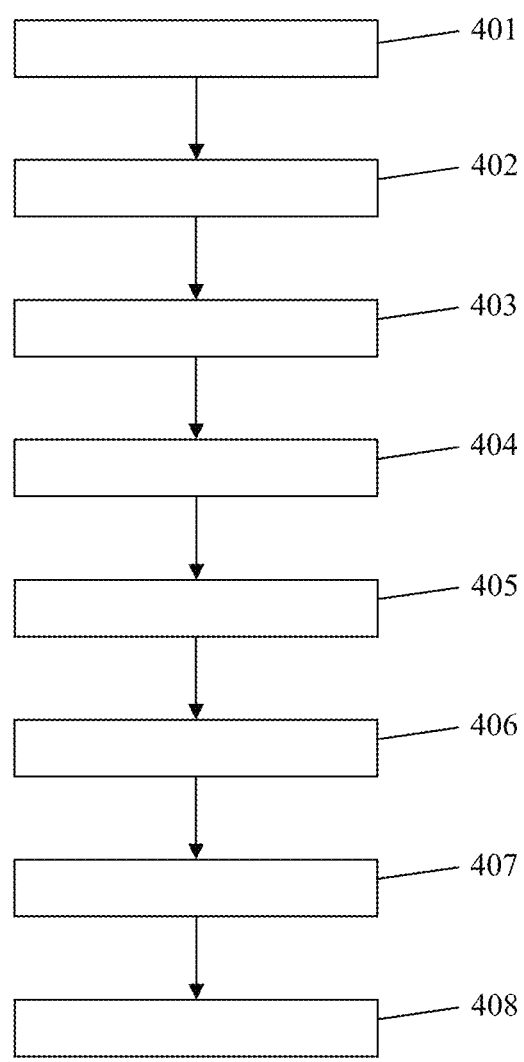
FIG. 4 shows a second embodiment of a sequence of method steps for data transmissions using RDMA between a first entity using a first data structure type and a second entity using a second data structure type.

Further, in FIG. 4, a second embodiment of a sequence of method steps for data transmissions using RDMA between a first entity 10 using a first data structure type and a second entity 20 using a second data structure type is depicted. In this regard, FIG. 5 shows a schematic block diagram of a device which is adapted to execute the method of FIG. 4.

Figure 5:
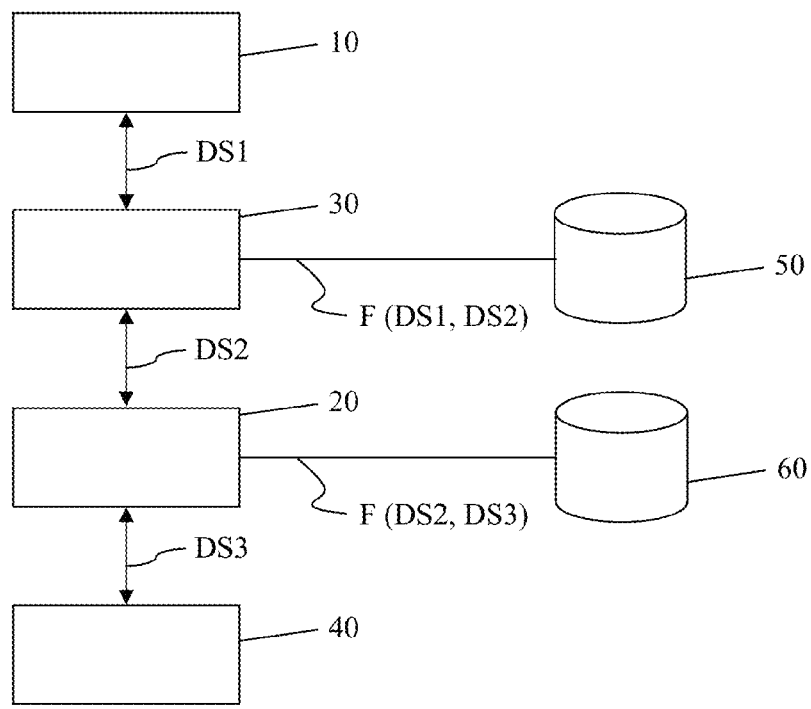
FIG. 5 shows a schematic block diagram of a third embodiment of a device for data transmissions using RDMA between a first entity using a first data structure type and a second entity using a second data structure type.

The device of FIG. 5 is based on the device of FIG. 2 and includes fourth entity 40 and further table 60. Further table 60 is coupled to second entity 20. Further table 60 is adapted to cache fingerprints F (DS2, DS3) of second data structures DS2 of the second data structure type in associated third data structures DS3 of a third data structure type being used by fourth entity 40.

In the following, the method of FIG. 4 is discussed with reference to the device of FIG. 5: in step 401, first data structure DS1 of the first data structure type is sent from first entity 10 to third entity 30. First data structure DS1 represents a certain RDMA function call. Third entity 30 is coupled to table 50 which is configured to cache fingerprints F (DS1, DS2) of first data structures DS1 of the first data structure type and associated second data structures DS2 of the second data structure type. First data structure DS1 and its associated second data structure DS2 represent the same RDMA function call. For each of these couples of DS1 and DS2, a respective fingerprint F (DS1, DS2) is stored in table 50.

In step 402, fingerprint F (DS1, DS2) for the sent first data structure DS1 is determined.

In step 403, second data structure DS2 of the second data structure type associated with the determined fingerprint F (DS1, DS2) is looked up in table 50, the looked up second data structure representing the certain RDMA function call.

In step 404, the looked up second data structure DS2 is sent to the second entity 20.

In step 405, second data structure DS2 looked up at table 50 coupled to third entity 30 is received at second entity 20.

In step 406, fingerprint F (DS2, DS3) of the received second data structure DS2 is determined.

In step 407, third data structure DS3 of the third data structure type associated with the determined fingerprint F (DS2, DS3) is looked up in further table 60. The looked up third data structure DS3 represents the certain RDMA function call as first and second data structures DS1, DS2 do.

In step 408, the looked up third data structure DS3 is sent to fourth entity 40.

For example, the first data structure type is embodied by a format of a first programming language, such as Java or C#. The second data structure type can be embodied by a format of a second programming language, for example C#. Further, third data structures DS3 of the third data structure type can be embodied as hardware-dependent representations of RDMA function calls.

Figure 6:
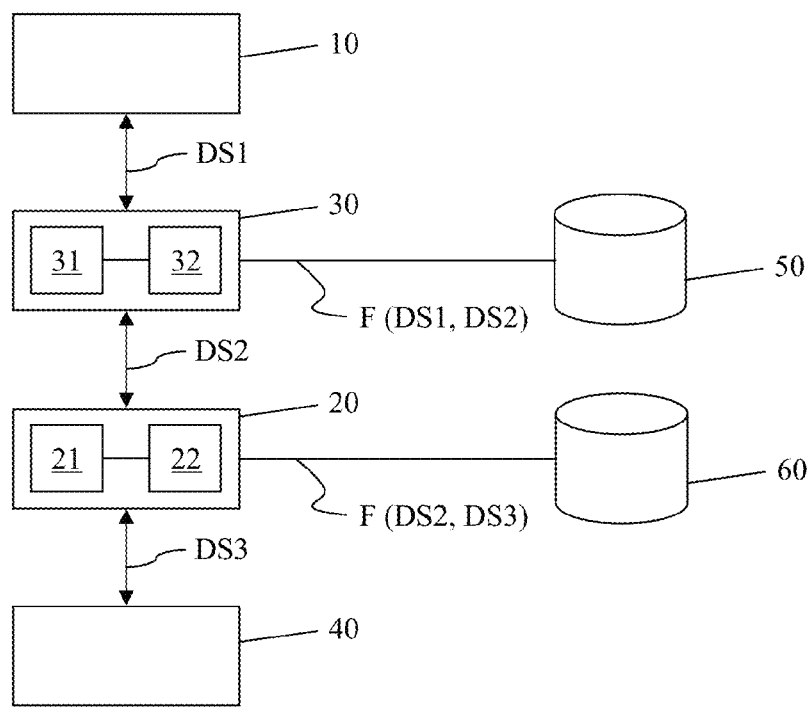
FIG. 6 shows a schematic block diagram of a fourth embodiment of a device for data transmissions using RDMA between a first entity using a first data structure type and a second entity using a second data structure type.

FIG. 6 shows a schematic block diagram of a fourth embodiment of a device for data transmissions using RDMA between first entity 10 using a first data structure type and second entity 20 using a second data structure type. The fourth embodiment of FIG. 6 is based on the third embodiment of FIG. 5 and underlines that third entity 30 can have RDMA library 31 and RDMA user driver 32 and that second entity 20 can have C library 21 and C user driver 22.

Figure 7:
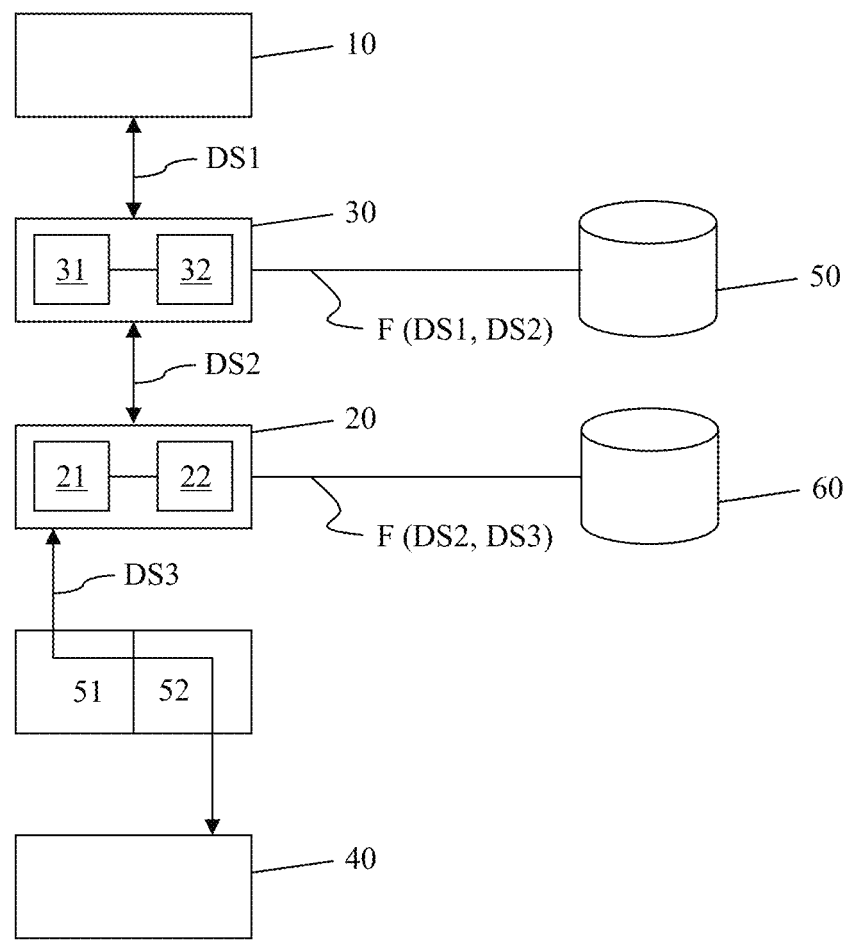
FIG. 7 shows a schematic block diagram of a fifth embodiment of a device for data transmissions using RDMA between a first entity using a first data structure type and a second entity using a second data structure type.

Moreover, FIG. 7 depicts a schematic block diagram of a fifth embodiment of a device for data transmissions using RDMA between first entity 10 using a first data structure type and second entity 20 using a second data structure type. The embodiment shown in FIG. 7 is based on the embodiment shown in FIG. 6 and shows a slow path between the application 10 and NIC 40 over OFA kernel 51 and a corresponding driver 52 coupled to NIC 40.

Figure 8:
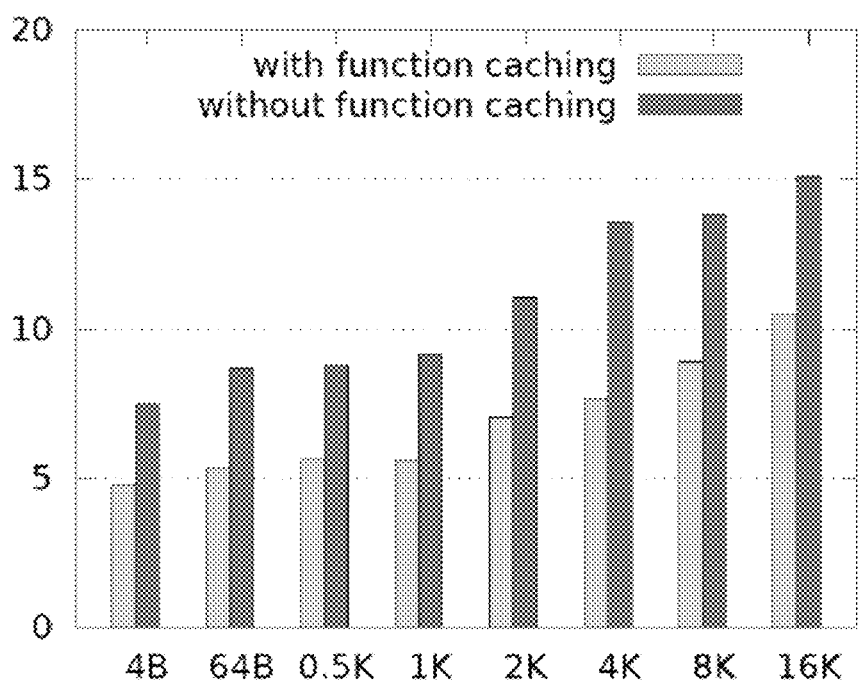
FIG. 8 shows a diagram illustrating RDMA read latency with function caching compared to RDMA read latency without function caching.

In FIG. 8, a diagram illustrating RDMA read latency with function caching and RDMA read latency without function caching is depicted. The x-axis of FIG. 8 shows different buffer sizes from 4 B to 16K, and the y-axis shows the ping/pong latency in µs.

Comparing the RDMA read latency with function caching to that without function caching, it is shown that function caching reduces latency by about 30% for buffer sizes smaller than 16K.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 1 or FIG. 4 may be implemented in software, as an executable program, the latter executed by suitable digital processing devices. More generally, embodiments of the present invention can be implemented wherein general-purpose digital computers, such as personal computers, workstations, etc., are used.

Figure 9:
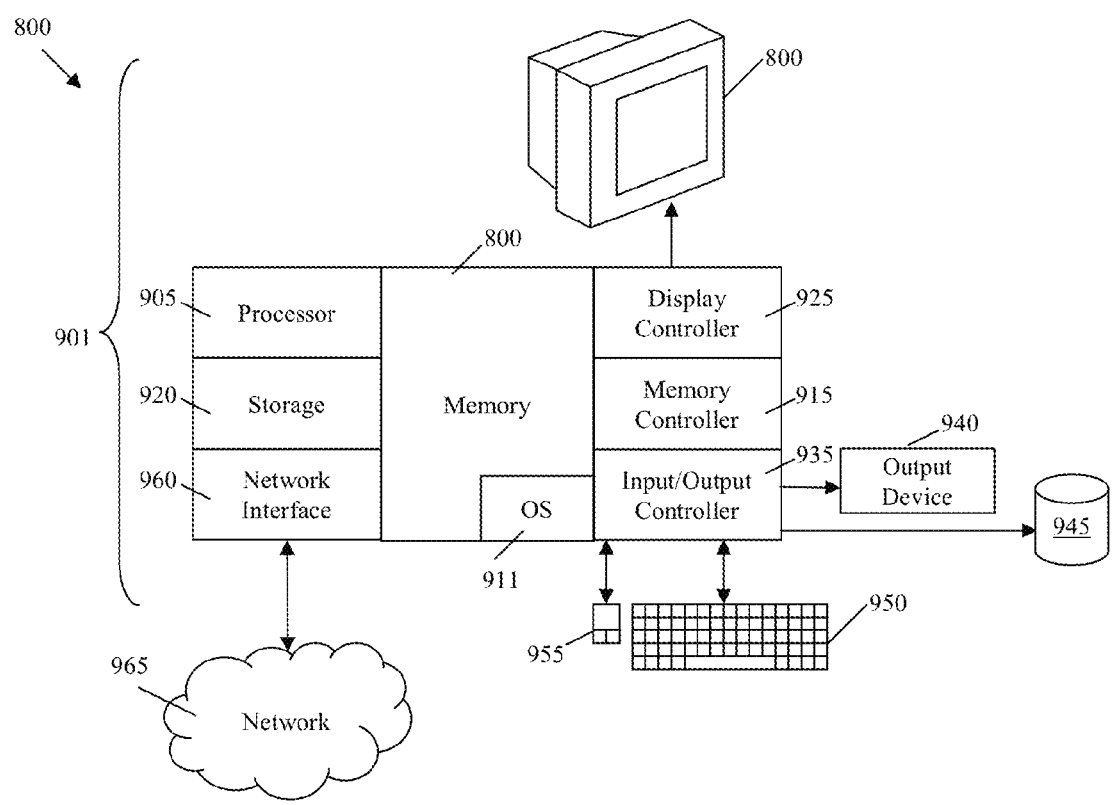
FIG. 9 shows a schematic block diagram of an embodiment of a system adapted for data transmissions using RDMA.

For instance, the system 900 depicted in FIG. 9 schematically represents a computerized unit 901, e.g., a general-purpose computer. In exemplary embodiments, in terms of hardware architecture, as shown in FIG. 9, the unit 901 includes processor 905, memory 910 coupled to memory controller 915, and one or more input and/or output (I/O) devices 940, 945, 950, 955, or peripherals, that are communicatively coupled via a local input/output controller 935. Input/output controller 935 can be, but is not limited to, one or more buses or other wired or wireless connections, as is known in the art. Input/output controller 935 can have additional elements, which are omitted for simplicity, such as controllers, buffers (caches), drivers, repeaters, and receivers, to enable communications. Further, the local interface can include address, control, and/or data connections to enable appropriate communications among the aforementioned components.

Processor 905 is a hardware device for executing software, particularly that stored in memory 910. Processor 905 can be any custom made or commercially available processor, a central processing unit (CPU), an auxiliary processor among several processors associated with the computer 901, a semiconductor based microprocessor, such as in the form of a microchip or chip set, or generally any device for executing software instructions.

Memory 910 can include any one or combination of volatile memory elements, e.g., random access memory, and nonvolatile memory elements. Moreover, memory 910 can incorporate electronic, magnetic, optical, and/or other types of storage media. Note that memory 910 can have a distributed architecture, where various components are situated remote from one another, but can be accessed by processor 905.

The software in memory 910 can include one or more separate programs, each of which includes an ordered listing of executable instructions for implementing logical functions. In the example of FIG. 9, the software in memory 910 includes methods described herein in accordance with exemplary embodiments and a suitable operating system (OS) 911. OS 911 essentially controls the execution of other computer programs, such as the methods as described herein (e.g., FIG. 1 or FIG. 4), and provides scheduling, input-output control, file and data management, memory management, and communication control and related services.

The methods described herein can be in the form of a source program, executable program (object code), script, or any other entity that includes a set of instructions to be performed. When in a source program form, then the program needs to be translated via a compiler, assembler, interpreter, or the like, as known per se, which may or may not be included within memory 910, so as to operate properly in connection with OS 911. Furthermore, the methods can be written as an object oriented programming language, which has classes of data and methods, or a procedure programming language, which has routines, subroutines, and/or functions.

Possibly, a conventional keyboard 950 and mouse 955 can be coupled to the input/output controller 935. Other I/O devices 940-955 can include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to input/output controllers 935 for further processing. Sensor nodes are ideally small, consume low energy, are autonomous and operate unattended.

In addition, I/O devices 940-955 can further include devices that communicate both inputs and outputs. System 900 can further include display controller 925 coupled to display 930. In exemplary embodiments, system 900 can further include a network interface or transceiver 960 for coupling to network 965.

Network 965 transmits and receives data between unit 901 and external systems. Network 965 is possibly implemented in a wireless fashion, e.g., using wireless protocols and technologies, such as WiFi, WiMax, etc. Network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

Network 965 can also be an IP-based network for communication between unit 901 and any external server, client and the like via a broadband connection. In exemplary embodiments, network 965 can be a managed IP network administered by a service provider. Besides, network 965 can be a packet-switched network such as a LAN, WAN, Internet network, etc.

If unit 901 is a PC, workstation, intelligent device or the like, the software in memory 910 can further include a basic input output system (BIOS). The BIOS is stored in ROM so that the BIOS can be executed when unit 901—here, a computer—is activated.

When unit 901 is in operation, processor 905 is configured to execute software stored within memory 910, to communicate data to and from memory 910, and to generally control operations of computer 901 pursuant to the software. The methods described herein and OS 911, in whole or in part are read by processor 905, typically buffered within processor 905, and then executed. When the methods described herein (e.g. with reference to FIG. 1) are implemented in software, the methods can be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on unit 901, partly thereon, partly on unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

We claim:

1. A method for data transmission using Remote Direct Memory Access (RDMA) between a first entity and a second entity over a third entity, the method comprising:
sending a first data structure of a first data structure type representing a certain RDMA function call from the first entity to the third entity, which is coupled to a table for caching fingerprints of the first data structures of a first data structure type and fingerprints of second data structures of a second data structure type associated therewith, wherein the sending the first data structure bypasses an operating system of a processor of the first entity;
determining the fingerprint for the sent first data structure;
looking up the second data structure of the second data structure type associated with the determined fingerprint in the table, the looked up second data structure representing the certain RDMA function call; and
sending the looked up second data structure to the second entity.

2. The method of claim 1 wherein the first data structures of the first data structure type are hardware independent representations of RDMA function calls.

3. The method of claim h wherein the second data structures of the second data structure type are hardware dependent representations of RDMA function calls.

4. The method of claim h wherein the first entity is a processor for sending and receiving data from a network, the second entity is a network interface controller, and the third entity is by an RDMA library and an RDMA user driver.

5. The method of claim 4, wherein the first data structure type is a format of a first programming language, in particular Java or C#.

6. The method of claim h wherein the first entity is a network interface controller, the second entity is a processor for sending and receiving data from a network, and the third entity is an RDMA library and an RDMA user driver.

7. The method of claim 1, wherein a further table is coupled to the second entity, the further table being adapted to cache fingerprints of second data structures of the second data structure type and associated third data structures of a third data structure type being used by a fourth entity.

8. The method of claim 7, further comprising:
receiving the second data structure looked up at the table coupled to the third entity at the second entity;
determining the fingerprint of the received second data structure;
looking up a third data structure of the third data structure type associated with the determined fingerprint in the further table, the looked up third data structure representing the certain RDMA function call; and
sending the looked up third data structure to the fourth entity.

9. The method of claim 7 wherein the first data structure type is a format of a first programming language, in particular Java or C#, and the third data structure type is a format of a second programming language, in particular C.

10. A computer readable non-transitory article of manufacture tangibly embodying computer readable instructions which, when executed, cause a computer to carry out the steps of a method according to claim 1.

11. The method of claim 1, wherein the fingerprint is generated after a re-occurring RDMA function call is received by the third entity.

12. The method of claim 1, wherein the fingerprint includes at least one work descriptor.

13. The method of claim 1, wherein the RDMA function call comprises a two-dimensional list of work descriptors.

14. A device for data transmission using remote direct memory access (RDMA) between a first entity and a second entity, the device comprising:
a receiver for receiving a first data structure of a first data structure type representing a certain RDMA function call from the first entity, wherein the first data structure bypasses an operating system of a processor of the first entity prior to the receiving the first data structure;
a table for caching fingerprints of first data structures of the first data structure type and second data structures of a second data structure type associated therewith;
a determiner for determining the fingerprint for the received first data structure;
a processor for looking up the second data structure of the second data structure type associated with the determined fingerprint in the table, the looked up second data structure representing the certain RDMA function call; and
a sender for sending the looked up second data structure to the second entity.

15. The device of claim 14, wherein the receiver, the determiner, the processor, and the sender are part of a third entity coupled between the first entity and the second entity.

16. The device of claim 15, wherein the first entity is a processor for sending and receiving data from a network, the second entity a network interface controller, and the third entity is an RDMA library and an RDMA user driver.

17. The device of claim 15, wherein the first entity is a network interface controller, the second entity is a processor for sending and receiving data from a network, and the third entity is a RDMA library and a RDMA user driver.

18. The device of claim 14, wherein the receiver, the processor, and the sender are part of a third entity coupled between the first entity and the second entity, and the determiner is part of the first entity.

19. The device of claim 14, wherein the fingerprint is generated after a re-occurring RDMA function call is received by the third entity.

20. The device of claim 14, wherein the RDMA function call comprises a two-dimensional list of work descriptors.

* * * * *